(Model.)

J. H. CATRON, R. FOSTER & W. R. GRAHAM.
GRAIN DRIER.

No. 255,099. Patented Mar. 21, 1882.

WITNESSES:
Chas. Hoyberger
Fred G. Dietrich

James H. Catron
Reuben Foster
William R. Graham
INVENTORS

J. Mc. Perkins
ATTORNEY.

UNITED STATES PATENT OFFICE.

JAMES H. CATRON, REUBEN FOSTER, AND WILLIAM R. GRAHAM, OF NEBRASKA CITY, NEBRASKA.

GRAIN-DRIER.

SPECIFICATION forming part of Letters Patent No. 255,099, dated March 21, 1882.

Application filed August 27, 1881. (Model.)

*To all whom it may concern:*

Be it known that we, JAMES H. CATRON, REUBEN FOSTER, and WILLIAM R. GRAHAM, of Nebraska City, in the county of Otoe and State of Nebraska, have invented certain new and useful Improvements in Grain-Driers; and we do hereby declare that the following is a full, clear, and exact description of the invention, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention its nature and extent will be shown in the claims.

The object of our invention is to produce a grain-drier which will effectually perform its work in the most economical manner. We do this by passing the grain by gravitation through a chamber heated on one side by steam and on the other side by hot air, or it may be heated on both sides by steam. The inner chamber is filled with steam, and is made in the form of a double cone whose apices are the extremities of the chamber. The grain-chamber is also in the form of a double cone and surrounds the steam-chamber, the walls of both chambers being equidistant from each other. Between the outer walls of our grain-drier and those of the grain-chamber hot-air circulates and passes out at the top of the machine.

Figure 1:
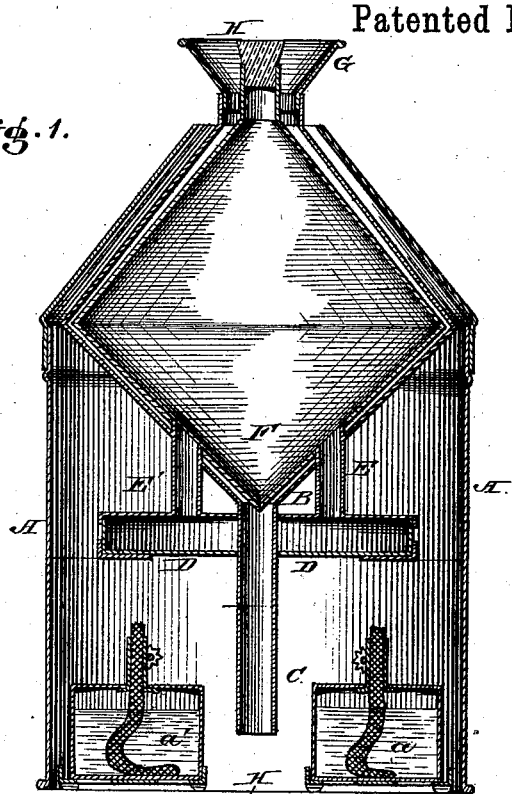
Figure 2:
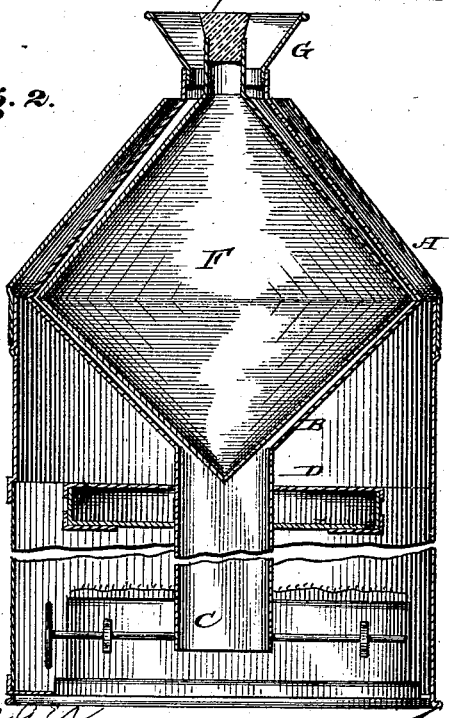

Figure 1 is a vertical sectional view of our invention. Fig. 2 is also a vertical view taken from front to rear, or at right angles to the view shown in Fig. 1.

A A are the outer walls of our drier.

B B are the outer walls of the grain-chamber, in the form of a double cone.

F is the steam-chamber, whose walls form the inner sides of the grain-chamber.

C is the conduit-pipe, which discharges the grain into a receiver below.

D is a wheel-shaped boiler, supplying the steam-chamber F by means of the connecting-pipes E E'.

G is the hopper, into which the grain is delivered for drying.

H is the aperture for the escape of steam from the chamber F when desired. a a' are the oil-lamps, which heat the water in the boiler D.

The heat generated by the lamps a a' converts the water in the boiler D into steam. The pipes E E' convey the steam to the steam-chamber F. The grain is then heated by the steam-chamber F on one side and on the other side by the heated air between the walls of the double cone B and the outside jacket, A. Into the hopper G the grain is delivered and passes over the walls of the steam-chamber F, and eventually finds its way to the discharging-pipe C, and then into the receiver below.

We are aware that it is not novel for the grain-chamber to be surrounded on the one side by the steam-chamber and on the other side by the hot-air chamber, and also for the grain to pass by gravitation from the hopper to the exit-pipe. This is already shown in Patents Nos. 107,680, 148,886, and in 234,130. We make no claim for what is shown in these patents.

Having now described our invention, what we claim, and desire to secure by Letters Patent, is—

1. In a grain-drier, the drum-shaped boiler D, pierced by the exit-pipe C and provided with the steam-pipes E E', in combination with the double-conical steam-chamber F and the grain-chamber surrounded on the one side by the steam-chamber and on the other side by the hot-air chamber and the outer wall, A, substantially as shown and described.

2. The hopper G and the steam-chamber F, whose walls are in the form of a double cone, in combination with the grain-chamber, whose outer walls are equidistant from the said steam-chamber F, the hot-air chamber, and its outer wall, A, said outer walls of the air and grain chambers conforming to the conical shape of the steam-chamber, substantially as shown and described, and for the purposes set forth.

In testimony that we claim the foregoing we have hereunto set our hands this 4th day of February, 1881.

JAMES H. CATRON.
REUBEN FOSTER.
WM. R. GRAHAM.

Witnesses:
  JAMES SWEET,
  CARLOS E. SWEET,
  ARTHUR C. SWEET.